United States Patent [19]

McLane et al.

[11] Patent Number: 5,277,053
[45] Date of Patent: Jan. 11, 1994

[54] SQUARE LAW CONTROLLER FOR AN ELECTROSTATIC FORCE BALANCED ACCELEROMETER

[75] Inventors: Daniel P. McLane, Westlake Village; Robert E. Stewart, Woodland Hills, both of Calif.

[73] Assignee: Litton Systems, Inc., Woodland Hills, Calif.

[21] Appl. No.: 908,520

[22] Filed: Jun. 29, 1992

Related U.S. Application Data

[62] Division of Ser. No. 514,114, Apr. 25, 1990, abandoned.

[51] Int. Cl.[5] .............................................. G01P 21/00
[52] U.S. Cl. ........................................ 73/10; 73/517 B; 364/553; 364/571.02
[58] Field of Search .................. 73.517B, 862.61, 1B, 1D, 701, 318, 648, 864, 553, 571.01, 571.02, 571.07

[56] References Cited

U.S. PATENT DOCUMENTS

| | | | |
|---|---|---|---|
| 4,282,470 | 8/1981 | Reynolds | 73/517 B |
| 4,483,194 | 11/1984 | Rudolf | 73/517 B |
| 4,584,885 | 4/1986 | Cadwell | 73/517 B |
| 4,611,304 | 9/1986 | Butenko et al. | 364/571.07 |
| 4,873,655 | 10/1989 | Kondraske | 364/553 |
| 5,095,750 | 3/1992 | Suzuki et al. | 73/517 B |

*Primary Examiner*—John E. Chapman
*Attorney, Agent, or Firm*—Poms, Smith, Lande & Rose

[57] ABSTRACT

An electrostatically force balanced accelerometer employs electrostatic, single sided square law forcing after filtering and scaling the pickoff signal to determine a restoring force required to bring the pendulous mass (10) of the accelerometer back to its null position. A signal (44,48) proportional to the square root of the restoring force is applied to an electrostatic square law forcing circuit (50) that applies a restoring force to one side or the other of the pendulum (10). A system output signal (42) is proportional to the calculated restoring force, and thus linearly proportional to the sensed acceleration. The transfer function of the forcing circuit (50) is empirically determined by applying a series of known accelerations and measuring the balancing signal required to restore the pendulous mass (10) to its null position. A feedback signal (44,48) is then generated which has a relation to the pickoff signal that is the inverse of the empirically determined transverse function of the forcing circuit.

3 Claims, 2 Drawing Sheets

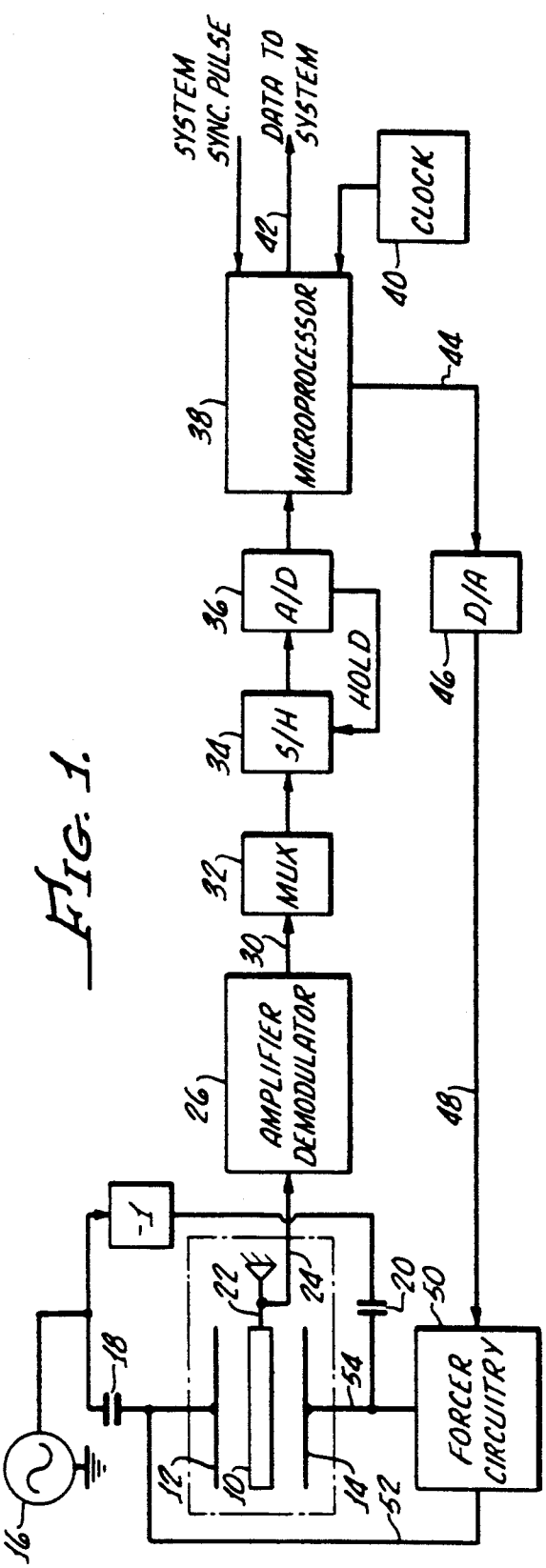

SQUARE LAW CONTROLLER FOR AN ELECTROSTATIC FORCE BALANCED ACCELEROMETER

RELATED APPLICATION

This is a divisional of copending application Ser. No. 07/514,114, filed Apr. 25, 1990, abandoned.

BACKGROUND OF THE INVENTION

The present invention relates to force balanced instruments of the closed loop type, and more particularly concerns control of a force balanced instrument having a linear output proportional to sensed input and in which a processed feedback signal provides a forcing signal to a selected side of the sensitive element.

Force balanced sensing instruments often use a sensing member that is movable from a nominal position in response to an input condition that is to be sensed. A position pickoff provides an indication of sensing member position and a feedback signal, based on the pickoff signal, applies a force to the sensing member that tends to return it to its nominal position The feedback signal may provide an instrument output signal representing the sensed input condition. It is generally desired that the instrument output signal be proportional to the input condition, and thus in many types of electrostatic and electromagnetic force balance sensing instruments special techniques are provided or required to obtain a linear relation between the instrument output and the sensed input. In electrostatic and electromagnetic instruments the forces applied by the instrument forcer are not linearly related to the feedback voltage or current supplied to the forcer. Furthermore, for optimum operation of the instrument itself, it is preferred that the feedback force applied by the feedback control network have a linear relation to the sensed input. Thus special techniques have been employed for obtaining such linearity.

For example, in an electrostatic force balanced accelerometer of the type shown in U.S. Pat. No. 4,679,434, for Integrated Force Balanced Accelerometer of Robert E. Stewart, electrostatic forcing in a closed loop system is employed to position and obtain an output from a pendulous inertial mass. The electrostatic forcing system employs a capacitative pickoff electrode on each side of a pendulous member that has been etched from a silicon substrate. The electrodes also apply nominally equal and opposite bias forces to the pendulous member, to which is applied a control voltage. In another control arrangement for an accelerometer of this type, a fixed bias voltage, V, is applied to the pendulous inertial mass, and feedback voltages $+v$ and $-v$, are applied concurrently to pickoff and forcing electrodes on opposite sides of the mass. Accordingly, omitting factors such as gap variation, parallelism, dielectric constants and the like, which may also affect force, the force applied by each electrode to the pendulous mass is proportional to $(V+v)^2$ and $(V-v)^2$, respectively. The net force on the pendulum applied by this control system then is the difference between the two forces, which is effectively proportional to $4vV$. As the bias voltage V is a constant, the feedback voltage, v, is proportional to the feedback force applied, and is also linearly related to the input acceleration experienced by the pendulous inertial mass.

This system has a number of problems, including the large negative spring effect associated with the required bias electrical fields. Even in the absence of any input acceleration to be sensed, the bias fields are required, and, since the bias field may vary and the pickoff null position may vary, the instrument may have poor null stability and repeatability. In the described prior system, many factors, such as gap variation, aging of components, temperature variations and the like provide sources of error that may result in a spurious output and decreased null stability. Potentially this spurious bias error is a large error. Small variations in electric field are exacerbated by the large negative spring effect in voltage biased systems. This negative spring effect is caused by the two large bias fields and may be quite large for typical ranges of accelerometer inputs The problems described above that exist in this oppositely biased electrostatically forced silicon accelerometer may also exist in other types of electrostatic or electromagnetic force balanced instruments where the applied feedback force is not linearly related to the feedback signal.

Accordingly, it is an object of the present invention to provide a closed loop force balanced instrument that avoids or minimizes above-mentioned problems.

SUMMARY OF THE INVENTION

In carrying out principles of the present invention in accordance with a preferred embodiment thereof, there is provided a method for controlling the sensing member of a force balanced measuring instrument of the type wherein a forcing device has a predetermined relation between a feedback signal applied thereto and an output force exerted by the forcing device on the sensing member. The method comprises generating a pickoff signal indicative of an input condition experienced by the sensing member, calculating force required to null the sensing member, employing the calculated force to provide a processed feedback signal having a relation to the calculated force that is the inverse of the relation between a control signal applied to the forcing device and its output force, applying the processed feedback signal to the forcing device and generating an output signal based upon the calculated force. According to one aspect of the invention, as embodied in a disclosed mechanization of the invention, the instrument pickoff signal is digitized and fed to a signal processor which effectively filters and scales the pickoff signal to compute the force required to null the sensing member and provides a system output based upon the computed force. A signal representing the computed force is then modified by a transfer function that is the inverse of the transfer function of the forcing device. This provides a control signal that is fed to the forcing device and applied thereby to one or the other of a pair of capacitative plates positioned on opposite sides of a sensing member. Accordingly, single sided forcing of the sensing member is provided by a voltage that is derived from a signal that is directly proportional to the input sensed by the instrument.

BRIEF DESCRIPTION OF THE DRAWINGS

FIG. 1 is a block diagram of a force balanced instrument embodying principles of the present invention applied to an electrostatic system;

FIG. 2 illustrates closed loop forcing circuitry of the instrument of FIG. 1.

DETAILED DESCRIPTION OF THE INVENTION

Figure 3:
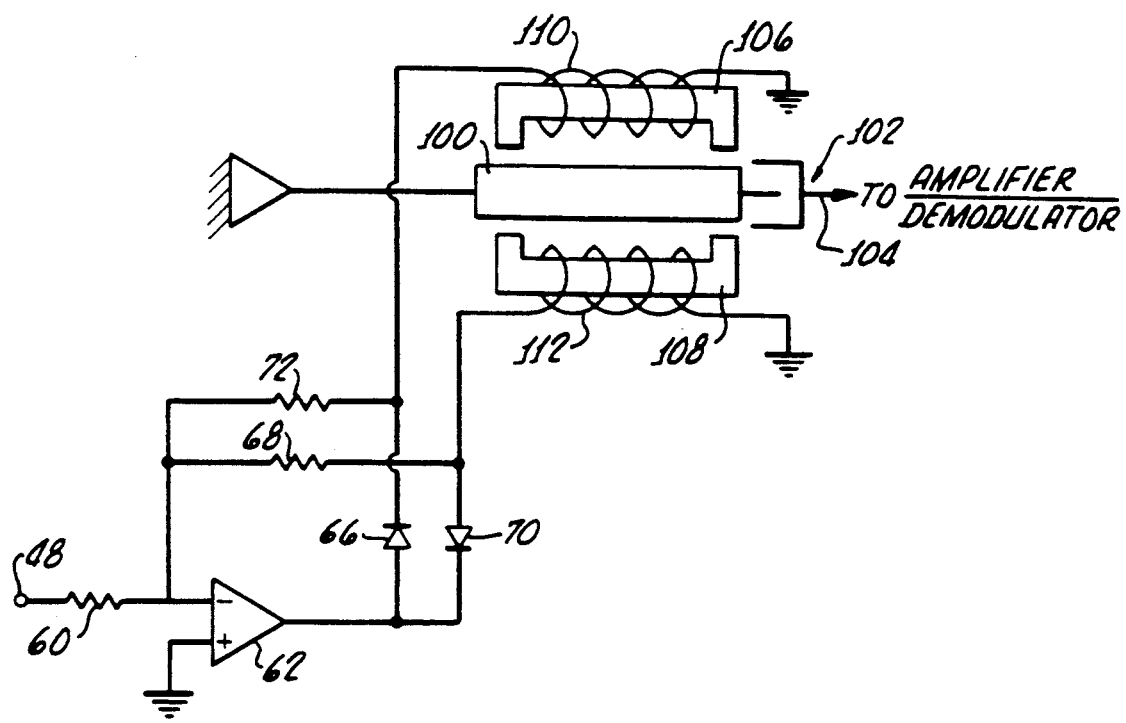
FIG. 3 illustrates an electromagnetic system.

The present invention may be embodied in many different types of square law force balanced instruments, whether electrostatically or electromagnetically balanced, or even those balanced by other means. However, the invention has been initially embodied in an electrostatically force balanced accelerometer of the type illustrated in U.S. Pat. No. 4,679,434, and it will be described as applied to such an instrument.

FIG. 1 schematically illustrates elements of an accelerometer of the type described in U.S. Pat. No. 4,679,434, as including a pendulous mass 10 and a pair of electrodes 12,14 positioned close to but slightly spaced from and on opposite sides of the mass 10. Electrodes 12,14 form pickoff and forcing plates. As described in detail in the U.S. Pat. No. 4,679,434, the pendulum comprises a central inertial mass that is etched from a semiconductor substrate, such as silicon. The inertial mass is attached to the substrate by hinges, all of which are formed by anisotropic etching of the single crystal silicon, so that the mass is connected to the substrate in a cantilevered arrangement to deflect along an instrument input axis in response to acceleration along such axis. The inertial mass is provided with electrically conductive surfaces on opposite sides thereof which are adjacent to but spaced along the input axis from electrically conductive surfaces of plates 12,14. The latter are energized by an AC source 16 providing opposite phase exciting signals via an inverter 17 capacitors 18 and 20 respectively to the plates 12,14 respectively at a relatively high frequency, in the order of 250 kilohertz, for example. The pendulum is connected via a line 22 to DC ground and provides on a line 24, suitably isolated from DC ground, a pickoff signal at the excitation frequency of the plates or electrodes 12,14. The pickoff signal is generated as the difference between signals on capacitors 18,20, and thus represents the difference between the electrostatic gap from the pendulum to the respective plates. The pickoff signal is provided to a circuit 26, including an operational amplifier and demodulator, that provides on an output line 30 a pickoff signal representing acceleration sensed by the inertial mass or pendulum 10.

In a three axis inertial measurement unit, three or more accelerometers of the type illustrated in U.S. Pat. No. 4,679,434, or equivalent instruments, are employed. Accordingly, certain processing circuitry is arranged to be commonly used by all of the instruments by means of a multiplexer, such as multiplexer 32. The latter receives the output of the amplifier demodulator 26 of the illustrated instrument and also receives the corresponding pickoff signals from each of the other instruments (not shown) of the inertial measurement unit. The output of the multiplexer is fed to a sample and hold circuit 34 which aids in the digitizing of the pickoff signal in an analog to digital converter 36. The digital pickoff signal from converter 36 is fed to a microprocessor 38 which receives inputs in the form of a system synchronization pulse and clock pulses from a clock circuit 40. A first output of microprocessor 38, provided on a line 42, is the system output which provides sensed acceleration data to the inertial measurement unit system. A second output is provided on a line 44 from the microprocessor as a feedback signal in digital form which is fed to a digital to analog converter 46 and thence via a line 48 as an analog control voltage to forcing circuitry 50. The latter provides forcing voltages to the pickoff plates 12,14 via lines 52,54, respectively, which are selected alternatively according to the polarity of the sensed displacement of the inertial mass 10. The sense of this displacement is preserved in the pickoff signal on line 30, and also in the feedback and control signals appearing on lines 44 and 48. The signal sense is employed by the forcer circuitry to select either line 52 or 54 for application of a single sided forcing control voltage.

In general, the microprocessor 38 filters and scales the digital pickoff signal from converter 36 to calculate a restoring force required to servo the pendulum back to its null position. A signal proportional to this force, which represents the force required to balance the acceleration experienced by the pendulum 10, appears on output line 42, which provides the signal sent to the user as the accelerometer output. Calculation of restoring forcing comprises well known techniques for digital filtering and scaling of the pickoff signal. Digital filtering eliminates noise in the pickoff signal and effectively limits frequency bandwidth of pickoff signal samples (as sampled by the multiplexer). The digital filtering takes into account prior signal values, prevents the signal from varying sharply from its prior values, and provides servo compensation to the device.

The transfer function of the electrostatic forcer is a function that provides an output force proportional to the square of the input voltage, and may include higher order terms that can be determined empirically. Therefore the number representing the restoring force required to servo the pendulum back to null is itself modified by the inverse of the forcer transfer function so that the force applied to the pendulum by the electrodes 12 or 14 will be proportional to the sensed input acceleration. Thus, for the electrostatic forcing electrodes illustrated, the control voltage is provided as the square root of the computed restoring force. The processor 38 computes the square root of the restoring force and provides this value on its output line 44. Accordingly, the control voltage on line 48 is proportional to the square root of the system output. As previously mentioned, the control voltage includes a sense (sign) of the pickoff signal for use by the forcer circuitry to select one or the other of electrodes 12 and 14 for application of the restoring force.

To keep track of sense of the pickoff signal, in an exemplary system, a mid-range value (such as 2048 for a twelve bit converter having a full range of 4096) is employed as zero. Accordingly, for a twelve bit digital to analog converter 46, an input value of 2048 is zero, input value of 4096 is full scale positive and an input value of zero is full scale negative, providing converter 46 with a bipolar output having a polarity determined by the sense of the input acceleration. Other arrangements may be employed to keep track of sense and to adjust range, as will be well known to those skilled in the art.

FIG. 2 illustrates a diagram of the closed loop forcer circuitry showing the control voltage on line 48 from the digital to analog converter 46 fed via a resistor 60 to the inverting input of an operational amplifier 62, having its non-inverting input held at ground. Thus the amplifier output is of one polarity or the other depending on polarity of the input control voltage on line 48. The output of the amplifier, on a line 64, is connected back to its inverting input via first and second feedback loops. The first of these includes a diode 66 and a second resistor 68 connected in series between the amplifier input and output. The second feedback loop comprises a second diode 70 poled oppositely with respect to diode 66 and a third resistor 72 connected in series between the amplifier output and input. The cathode of diode 70, which is connected to feedback resistor 72, is also connected to forcing plate or electrode 12, whereas the anode of diode 66, which is connected to feedback resistor 68, is connected to forcing plate 14.

The control voltage fed to the forcing circuitry from the digital to analog converter 46 is a bipolar voltage, to cause the output of operational amplifier 62 to have one polarity or the other according to the sense of the pickoff signal Polarity of the input voltage on line 48 determines whether the output of the amplifier 62 is positive or negative, and thus determines whether the control voltage is applied through diode 66 to plate 14 or, in the alternative, through diode 70 to plate 12. The closed loop operational amplifier configuration, with the diodes connected in the amplifier feedback loop, eliminates the variability of the diode turn-on voltage, which may change due to temperature or from device to device. Resistors 60,68, and 72 control the loop gain.

In operation, the electrodes 12,14 are excited by the relatively high frequency AC excitation source 16 to provide the high frequency pickoff signal on line 24 that represents sensed pendulum position This signal is amplified and demodulated to provide a DC pickoff signal on line 30 which is converted to digital form for processing. The processing includes filtering and scaling to generate a signal proportional to the force required to restore the pendulum to null position, and this signal is provided as the system output. The processing also provides a control voltage, having a transfer function that is the inverse of the transfer function of the forcer so that the force applied by the forcing circuit is proportional to the restoring force computed by the microprocessor. In the described embodiment, the transfer function of the forcer provides an output that is the square of the input, so that the inverse transfer function employed to compute the restoring force signal is simply a square root. However, a forcer may have a transfer function of predetermined relation other than a simple square law function and may, for example, include third or higher order terms. Specifics of the forcer transfer function can be determined empirically upon calibration of the instrument and such specific transfer function (or its inverse) is imposed upon the calculated restoring force to obtain the desired control signal for the forcing circuitry. The processor can be reprogrammed as appropriate to accommodate a different forcer with a different transfer function.

For calibration, a series of known accelerations is applied to the instrument and a balancing signal is applied to the instrument forcing circuit, for each applied acceleration, to null the pendulum for each acceleration. Magnitudes of each balancing signal and the associated pickoff signal are measured for each acceleration to effectively define the transfer function of the forcing circuit and the instrument scaling.

Illustrated in FIG. 3 is a system substantially identical to that illustrated in FIGS. 1 and 2, except for the fact that electromagnetic attraction is employed instead of electrostatic attraction. In this system the sensing mass 100 corresponds to the sensing mass 10 of FIG. 1 and is flexurally mounted, as previously indicated. A pickoff generally indicated at 102 detects position of the mass and sends a pickoff signal via line 104 to an amplifier demodulator and further circuitry, such as shown in FIG. 1. In this embodiment the capacitative plates 12,14 are replaced by cores 106,108 of magnetic material fixedly mounted to suitable support (not shown) on either side of the magnetic mass 100, and having electrical coils 110,112 respectively wound thereon. The coils are energized by the forcer circuitry which is identical to the forcer circuitry 50 illustrated in FIGS. 1 and 2. In this magnetic circuit, as in the electrostatic circuit, the force exerted by the electromagnetic forcer is proportional to the square of the control signal input provided to the forcing circuitry, and thus all of the previous description of function and operation applies to this system also. The terms magnetic and electromagnetic, as used herein, include both ferromagnetic and diamagnetic materials and devices.

Various techniques well known to those skilled in the art may be used to provide filtering in the microprocessor. In an exemplary system the following filter equation may be employed in the microprocessor:

$$y(n) = Ax(n) + Bx(n-1) + Cx(n-2) + Dx(n-3) + Ey(n-1) + Fy(n-2) + Gy(n-3)$$

where:
$y(n)$ is the output of the microprocessor for a period n;
$y(n-1)$ is the output for a period $n-1$; etc.;
$x(n)$ is the input for period n; and
$x(n-1)$ is the input for period $n-1$, etc.

In this exemplary system the several coefficients of the equation are as follows:
$A = 0.5$
$B = 0.57282$
$C = -0.35436$
$D = -0.42718$
$E = -0.847$
$F = -0.2012$
$G = -0.327$

We claim:

1. A method for driving the sensing member of a closed loop force balanced measuring instrument wherein said sensing member is displaced from a null position in response to an input condition that is to be measured, and wherein a feedback signal is applied to a forcing device that exerts a force on the sensing member tending to decrease displacement of the sensing member from said null position, said forcing device having an unknown transfer function, said forcing device being responsive to said feedback signal to exert a restoring force on said sensing member, said method comprising:

calibrating said instrument to empirically determine said transfer function, said step of calibrating comprising:

applying a series of known accelerations to the instrument, applying to the instrument forcing device a balancing signal to drive the sensing member to said null position for each of said series of known accelerations, and measuring the magnitude of each balancing signal and the associated pickoff signal to effectively define and empirically determine the transfer function of the forcing device and instrument scaling, generating a pickoff signal indicative of an input condition experienced by said sensing member, processing said pickoff signal to calculate a restoring force representing force required to move said sensing member to said null position and to calculate within the closed loop a feedback signal having a relation to said restoring force that is the inverse of said empirically determined transfer function, applying said feedback signal to said forcing device, and generating an output signal based upon said restoring force.

2. A method for actuating the forcing device of a closed loop force balanced instrument having a sensing element that tends to be displaced from a null position upon experiencing a condition to be detected, having a pickoff signal indicative of displacement of said element, and having a forcer with an unknown transfer function, said forcer exerting force on said sensing element in repose to a feedback signal applied to said forcer, said method comprising the steps of:

calibrating said instrument to empirically determine said transfer function of said forcer, said step of calibrating comprising:

applying a series of known accelerations to the instrument, applying to the instrument forcer a balancing signal to drive the sensing member to said null position for each of said series of known accelerations, and measuring the magnitude of each balancing signal and the associated pickoff signal to effectively define and empirically determine the transfer function of the forcer and instrument scaling, processing said pickoff signal within the closed loop to generate a feedback signal having a relation to said pickoff signal that is the inverse of said empirically determined transfer function and to generate an output signal that is a function of said pickoff signal, applying said feedback signal to said forcer, and causing said forcer to apply a restoring force to said sensing element.

3. The method of claim 2 wherein said transfer function includes a first order terms, a second order term and third and higher order terms, and wherein said step of calibrating comprises empirically determining said second order term and said third and higher order terms.

* * * * *